(12) United States Patent
Meyer et al.

(10) Patent No.: US 11,820,301 B2
(45) Date of Patent: Nov. 21, 2023

(54) GRIPPING ELEMENT FOR ARRANGEMENT ON A COMPONENT

(71) Applicant: HELLA GmbH & Co. KGaA, Lippstadt (DE)

(72) Inventors: Andreas Meyer, Lippstadt (DE); Burkhard Misselwitz, Salzkotten (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 132 days.

(21) Appl. No.: 17/492,197

(22) Filed: Oct. 1, 2021

(65) Prior Publication Data

US 2022/0017028 A1 Jan. 20, 2022

Related U.S. Application Data

(63) Continuation of application No. PCT/EP2020/057199, filed on Mar. 17, 2020.

(30) Foreign Application Priority Data

Apr. 4, 2019 (DE) ...................... 10 2019 108 810.0

(51) Int. Cl.
*H01B 7/36* (2006.01)
*B60R 16/02* (2006.01)
*H01B 7/40* (2006.01)

(52) U.S. Cl.
CPC ......... *B60R 16/0215* (2013.01); *H01B 7/365* (2013.01); *H01B 7/40* (2013.01)

(58) Field of Classification Search
CPC .. B60R 16/0207; B60R 16/0215; H01B 7/365
See application file for complete search history.

(56) References Cited

U.S. PATENT DOCUMENTS

| 4,268,986 A | * | 5/1981 | Piana ...................... G09F 3/205 40/661 |
| 4,876,810 A | * | 10/1989 | Piana ..................... H01B 7/368 40/316 |
| 10,525,906 B2 | * | 1/2020 | Tsukamoto ......... B60R 16/0207 |
| 2014/0012416 A1 | | 1/2014 | Negishi et al. |
| 2015/0224650 A1 | | 8/2015 | Xu et al. |
| 2018/0118293 A1 | | 5/2018 | Kato |
| 2020/0122219 A1 | * | 4/2020 | Ruch ....................... B25B 27/10 |
| 2022/0166202 A1 | * | 5/2022 | Steeger ................... H02G 3/32 |
| 2022/0246325 A1 | * | 8/2022 | Sumida .................... H01B 7/08 |

FOREIGN PATENT DOCUMENTS

| DE | 11 2016 001 554 T5 | 12/2017 | |
| EP | 1 488 893 A2 | 12/2004 | |
| JP | 2011024311 A | * 2/2011 | ............... H02G 1/00 |
| JP | 2014-231110 A | 12/2014 | |

* cited by examiner

*Primary Examiner* — Paresh Paghadal
(74) *Attorney, Agent, or Firm* — Muncy, Geissler, Olds & Lowe, P.C.

(57) ABSTRACT

A gripping element for arrangement on a component, wherein the component, in particular a cable harness, is of flexible design and has a changeable form, wherein the gripping element has at least one optically detectable marker via which a spatial orientation of the gripping element is detectable by an optical recognition device, and wherein the gripping element is grippable by a gripper.

12 Claims, 2 Drawing Sheets

GRIPPING ELEMENT FOR ARRANGEMENT ON A COMPONENT

This nonprovisional application is a continuation of International Application No. PCT/EP2020/057199, which was filed on Mar. 17, 2020, and which claims priority to German Patent Application No. 10 2019 108 810.0, which was filed in Germany on Apr. 4, 2019, and which are both herein incorporated by reference.

BACKGROUND OF THE INVENTION

Field of the Invention

The present invention relates to a gripping element for arrangement on a component, wherein the component, in particular a cable harness, is designed to be flexible and have a changeable form.

Description of the Background Art

When handling flexible components that are changeable in form for mounting purposes, for example when mounting cable harnesses in a vehicle headlight, two challenges in particular have to be overcome with regard to process automation with the aid of a robot, which consist of reliably detecting the orientation of the component and safely gripping the component without causing damage.

First of all, correct recognition of the position and orientation of the component supplied for mounting must be ensured. For example, a cable harness to be assembled for a vehicle headlight may be made up according to geometric and electrical requirements, and, in particular, branches and electrical connection elements may be arranged at specified positions along the cable harness, so that during assembly it is imperative to position the cable harness in a specified orientation in its installation position. Identifying the orientation is complicated by the fact that the cable harness, as an element changeable in form, for example in that it may wind or twist, does not have a well-defined shape, so that an automated, software-supported recognition device based on an optical detection system is typically unable to make an error-free identification of the cable harness orientation. This problem is exacerbated if the cable harness provided for the mounting process is in the form of bulk material, i.e., if a large number of cable harnesses arranged randomly on top of each other and intertwined are brought into the field of view of the automatic recognition device.

DE 11 2016 001 554 T5, which corresponds to US 2018/0118293 discloses a harness module having a wire harness formed in a collapsed shape, comprising: a wire harness formed by bundling a plurality of electric wires; one or more connectors each attached to one end of the wire harness, wherein by folding the plurality of electric wires, the one or more connectors are attached to predetermined positions on the wire harness; one or more fixing components for fixing the wire harness to a vehicle, wherein the one or more fixing components are attached to the wire harness at specific positions; and an information storage unit for storing first information regarding the positions at which the one or more connectors are attached and the positions at which the one or more fixing components are attached. According to the invention, the information stored in the information storage unit can thereby be used as installation instructions for assembly, but this does not solve the problem of error-free recognition of the orientation of the delivered harness module, rather, knowledge of the exact harness orientation is required to use the information stored in the information storage unit.

Furthermore, when using a gripping robot to handle flexible components that are changeable in form, it is difficult to ensure that the robot grips the component safely and without damage. The reason for this is the lack of haptic capabilities in gripping robots, and if a fixed contact force is selected for the gripper when grasping a flexible component, there is the risk of the gripper either losing the component when performing a movement or damaging it due to excessive gripping pressure.

Against this background, the handling of flexible components that are changeable in form in industrial production is usually carried out entirely by hand by work personnel, in particular in the assembly of line groups consisting of cable harnesses in vehicle headlights. The disadvantage of manual assembly processes is the inherently high susceptibility to errors, which is reflected in inconsistent product quality and therefore requires a high level of effort in terms of quality control as well as a high reject rate of defective products.

SUMMARY OF THE INVENTION

It is therefore an object of the present invention to improve the handling of a flexible component that is changeable in form, in particular a cable harness, which overcome the aforementioned disadvantages of the prior art and, in particular, enable an automatic handling process with the aid of a gripping robot.

This object is achieved on the basis of a gripping element for arrangement on a flexible component.

The invention includes the technical teaching that the gripping element has at least one optically detectable marker via which a spatial orientation of the gripping element is detectable by an optical recognition device, and that the gripping element is grippable by a gripper.

The invention is based on the idea of arranging a gripping element in a defined orientation on the flexible component as an aid for automatic handling, so that the gripping element both assumes the function of a marker indicating the component orientation and is also designed in such a way that it is suitable for robust gripping by the gripping robot. For identifying a component orientation via an automatic recognition device using a camera and image recognition software, the advantage according to the invention consists in the fact that instead of the component, which is changeable in form and therefore per se extremely difficult to detect, and which in the case of a bulk supply may also be wrapped around other components, the gripping element now provides a distinctive marker, unchangeable in its shape, serving as an easily detectable target object for purposes of image recognition. Due to the well-defined and fixed orientation relationship between the component to be handled and the gripping element arranged on it, the orientation of the component can be clearly inferred from the detected orientation of the gripping element. Based on this, corresponding control commands can be issued to a gripping robot to grasp the gripping element and position the component in a target orientation. In order to be suitable for gripping by a gripping robot, the gripping element is made of a rigid and pressure-resistant material, for example hard plastic materials such as thermoplastics or thermosets, and also advantageously has a geometrically simple shape adapted to the dimensions of the gripper. For example, the section of the gripping element intended for gripping can be spherical, rod-shaped, or cylindrical.

The optically detectable marker can be formed by an asymmetrical shape of the gripping element. The shape of the gripping element is advantageously such that the orientation of the gripping element is optically identifiable from the widest possible range of viewing angles, so that error-free detection is ensured even in the case of irregular or bulk material provision. In particular, the shape of the gripping element can be designed in such a way that it has a first side and a second side which are clearly and distinctively different from one another and which correspond to a first side and a second side of the flexible component, for example in the case of a cable harness of a line group for a vehicle headlight, with a first side for connection to the vehicle electrical system and a second side for connection to electrical modules such as light modules or control units accommodated in the headlight housing.

The optically detectable marker of the gripping element can alternatively or additionally be formed as a graphic element on a surface of the gripping element. This can be, for example, a high-contrast, advantageously additionally colored engraving, or suitably printed stickers.

The gripping element can comprise a mounting element via which the gripping element can be fastened to the flexible component. The mounting element is individually adapted to the component to be handled, for example in the form of a cable duct for accommodating a cable harness section. The connection between the mounting element and the flexible component can be of a fixed or detachable design. The mounting element and the section of the gripping element intended for gripping by the gripper are advantageously manufactured as a single-piece component, for example via injection molding, or are bonded or soldered or welded to one another or connected to one another by a screw or riveted connection.

The gripping element can have a mount for mounting to a mounting fixture. The mounting fixture is part of an assembly into which the flexible component is integrated during assembly. The gripping element according to the invention can thus serve as a connecting member between the flexible component and the assembly, wherein the mount can be designed, for example, as an eyelet or as a hook or as part of a screw connection, or else comprises a designated contact surface for establishing a positive connection with the assembly, for example via bonding or soldering or welding.

The invention further relates to a method for handling an assembly that is easy to handle and comprises a flexible component that is changeable in form, in particular a cable harness, and at least one gripping element according to the invention according to one of the aforementioned embodiments, wherein the method comprises at least the following method steps: the optical detection of the orientation of the gripping element via an optical recognition device, and gripping of the gripping element in the required target orientation via a gripper.

According to the invention, a further method step can also be carried out, which consists of mounting the assembly via the mount to a mounting fixture, in particular to a headlight.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
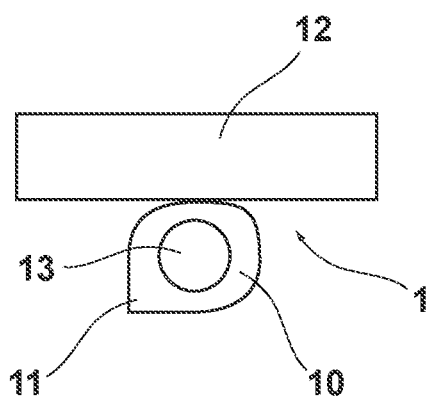
FIG. 1 is a gripping element according to the invention.

FIGS. 1 to 4 show an embodiment of the gripping element 1 according to the invention, comprising the gripping section 10, the optically detectable marker 11, the mounting element 12 and the mount 13. The gripping section 10 is used for gripping by a gripper and has an essentially hollow cylindrical shape, with an asymmetrical, arrow-like formation which represents the marker 11. Thanks to its geometrically simple shape, the gripping section 10 is suitable for gripping from different directions, so that secure gripping of the gripping section 10 by a gripper is possible even when the gripping element 1, when arranged on a component, is fed in an irregular or bulk-like manner. Via the integrally formed marker 11, the spatial orientation of the gripping element 1 can be unambiguously identified, wherein the arrow-like shape shown here is to be regarded only as a suitable example, which, in particular, does not substantially restrict the accessibility of the gripping section 10 for a gripper. The mount 13 functions as an eyelet, i.e., the gripping element 1 can be received therewith, for example, on a mandrel or hook.

Figure 2:
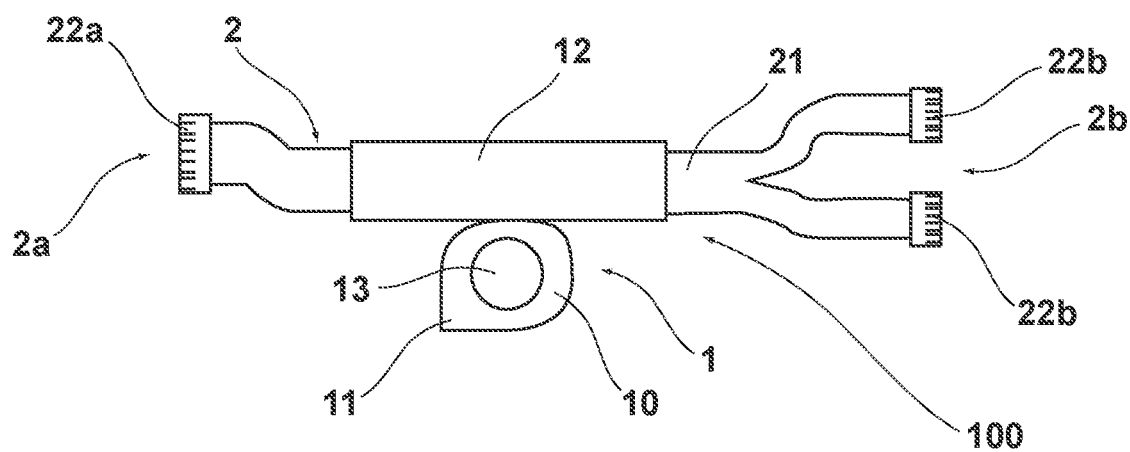
FIG. 2 is an assembly according to the invention.
Figure 3:
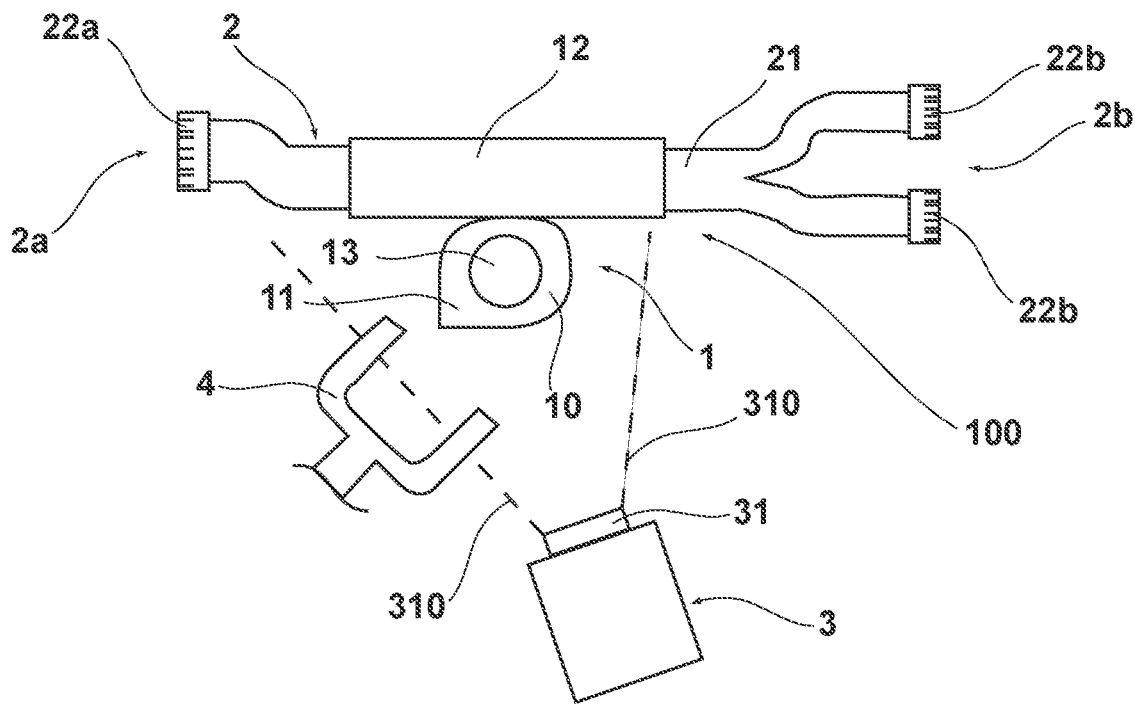
FIG. 3 is an illustration of the method according to the invention.
Figure 4:
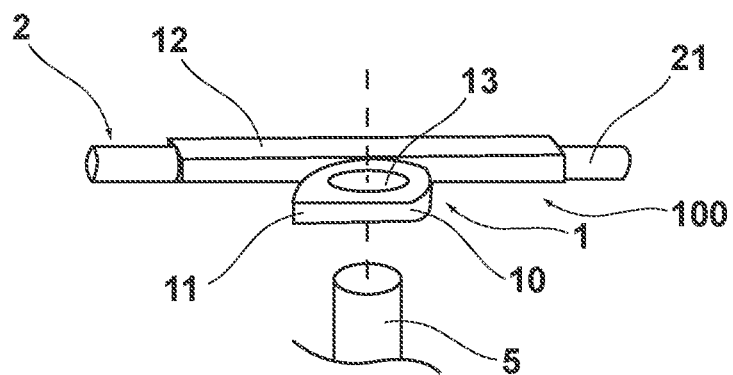
FIG. 4 is an illustration of an advantageous method step.

The mounting element 12 connected to the gripping section 10 is shaped as a hollow cylinder or hollow cuboid and, in the example shown, serves as a cable duct for accommodating a section of a component 2 shown in FIGS. 2 to 4, which is in the form of a cable harness 21. For this purpose, the mounting element 12 advantageously has an axially extending cut or slot and is made of a flexible plastic, so that it can be bent open along the cut or slot to insert the cable harness 21. Subsequently, a fixed connection can be created between the mounting element 12 and the cable harness 21 received therein, for example via bonding. In the example shown, the cable harness 21 terminates in a single connector 22a on the first side 2a and branches out into two further connectors 22b on the side 2b, wherein the connectors 22a and 22b are able to serve, for example, for the electrical contacting of headlights and an associated control unit. On the basis of the marker 11, it is thus possible to infer the orientation of the component 2, i.e., the position of the first side 2a and the second side 2b, from the orientation of the gripping element 1. Beyond the example shown here, a plurality of gripping elements can in principle be arranged along a flexible component.

FIG. 3 illustrates the automated method for handling an assembly 100 of the invention. The camera 31 of the recognition device 3 detects the gripping element 1 in its field of view 310, and the recognition device 3 identifies the orientation of said gripping element on the basis of the position of the marker 11 using an image recognition program, and accordingly, the orientation of the component 2 is concluded. Based on this, control commands are issued to the automatic gripper 4 for gripping the gripping element 1 in an expedient target orientation. Due to its geometrically simple shape, the gripping section 10 is accessible to the gripper 4 from a wide angular range, so that safe gripping and subsequent movement of the assembly 100 by the gripper 4 is ensured even if the assembly 100 is supplied with irregular or bulk material.

FIG. 4 illustrates the mounting of the assembly 100 on a mounting fixture 5, which may for example be part of a vehicle headlight in which the cable harness 21 is to be mounted. The mounting fixture 5 is formed as a cylindrical pin which is received in the mount 13, so that the gripping element 1 is secured at least against lateral displacement. For further locking, the connection between the gripping element 1 and the mounting fixture 5 can also be reinforced, for example, via bonding or welding.

The invention is not limited in its embodiment to the preferred exemplary embodiment given above. Rather, a number of variants are conceivable which make use of the presented solution even in fundamentally different embodiments. All features and/or advantages resulting from the claims, the description, or the drawings, including constructional details, spatial arrangements, and process steps, can be essential to the invention both individually and in the most diverse combinations.

What is claimed is:

1. A gripping element arranged on a flexible component that has a changeable form, the gripping element comprising:
   a gripping section that is grippable by a gripper,
   wherein the gripping section has at least one optically detectable marker, via which a spatial orientation of the gripping element is detectable by an optical recognition device,
   wherein the spatial orientation of the gripping element is associated with a spatial orientation of the flexible component, such that due to the gripping element being arranged on the flexible component in a defined orientation, the detection of the spatial orientation of the gripping element by the optical recognition device provides a spatial orientation of the flexible component.

2. The gripping element according to claim 1, wherein the marker is formed by an asymmetrical shape of the gripping element.

3. The gripping element according to claim 1, wherein the marker is formed as a graphic element on a surface of the gripping element.

4. The gripping element according to claim 1, wherein the gripping element comprises a mounting element via which the gripping element is fastened to the flexible component.

5. The gripping element according to claim 1, wherein the gripping section has a mount for mounting on a mounting fixture.

6. An assembly that is adapted to be individually handled, the assembly comprising:
   at least one of the gripping element according to claim 1; and
   the flexible component that has a changeable form.

7. The assembly according to claim 6, wherein the flexible component has a first side and a second side, wherein a spatial orientation of the first side and the second side is identifiable on the basis of the spatial orientation of the gripping element.

8. The gripping element according to claim 1, wherein the flexible component is a cable harness.

9. The assembly according to claim 6, wherein the flexible component is a cable harness.

10. A method for handling an assembly that includes a flexible component that has a changeable form and at least one gripping element arranged on the flexible component, the at least one gripping element including a gripping section that is grippable by a gripper and the gripping section having at least one optically detectable marker, via which a spatial orientation of the gripping element is detectable by an optical recognition device, the method comprising:
    optically detecting the spatial orientation of the gripping element by optically detecting the at least one optically detectable marker via the optical recognition device; and
    gripping the gripping section of the gripping element in a required target orientation via the gripper,
    wherein, the spatial orientation of the gripping element is associated with a spatial orientation of the flexible component, such that due to the gripping element being arranged on the flexible component in a defined orientation, the detection of the spatial orientation of the gripping element by the optical recognition device provides a spatial orientation of the flexible component.

11. The method according to claim 10, further comprising: mounting the assembly, via a mount provided in the gripping section, on a mounting fixture.

12. The method according to claim 11, wherein the mounting fixture is part of a headlight.

* * * * *